United States Patent
Högberg et al.

(10) Patent No.: US 11,323,889 B2
(45) Date of Patent: May 3, 2022

(54) COMMUNICATION DEVICE USING TWO WIRELESS PROTOCOLS

(71) Applicant: Sonova AG, Stäfa (CH)

(72) Inventors: Jonas Högberg, Stäfa (CH); Daniel Lucas-Hirtz, Rapperswil (CH); Amre El-Hoiydi, Neuchâtel (CH); Federico Ferrari, Bern (CH); Marc Secall, Constantine (CH); Michael Osterwalder, Winterthur (CH); Georg Dickmann, Ebmatingen (CH)

(73) Assignee: SONOVA AG, Stäfa (CH)

(*) Notice: Subject to any disclaimer, the term of this patent is extended or adjusted under 35 U.S.C. 154(b) by 0 days.

(21) Appl. No.: 17/293,959

(22) PCT Filed: Nov. 14, 2018

(86) PCT No.: PCT/EP2018/081166
§ 371 (c)(1),
(2) Date: May 14, 2021

(87) PCT Pub. No.: WO2020/098930
PCT Pub. Date: May 22, 2020

(65) Prior Publication Data
US 2022/0007201 A1    Jan. 6, 2022

(51) Int. Cl.
*H04W 16/14*   (2009.01)
*H04W 4/80*   (2018.01)
*H04W 88/06*   (2009.01)

(52) U.S. Cl.
CPC ............ *H04W 16/14* (2013.01); *H04W 4/80* (2018.02); *H04W 88/06* (2013.01)

(58) Field of Classification Search
CPC ........ H04W 16/14; H04W 4/80; H04W 88/06
See application file for complete search history.

(56) References Cited

U.S. PATENT DOCUMENTS

| 8,964,586 B2 * | 2/2015 | Xhafa ................. H04W 76/10 370/252 |
| 2013/0064118 A1 | 3/2013 | Robinson et al. |

(Continued)

FOREIGN PATENT DOCUMENTS

WO    2011/044056 A2    4/2011

OTHER PUBLICATIONS

International Search Report for PCT/EP2018/081166 dated Jun. 18, 2019.

*Primary Examiner* — David Bilodeau
(74) *Attorney, Agent, or Firm* — Pearne & Gordon LLP (57) ABSTRACT

A communication device, including a wireless interface including a transceiver unit, and a controller configured to control the transceiver unit when applying a first protocol which is a Bluetooth Low Energy protocol and a second protocol which is suitable for exchanging both audio data and non-audio data. The controller is further configured to apply a first control configuration while the transceiver unit is not used for audio data reception and/or transmission of audio data via the second protocol, and to apply a second control configuration while the transceiver unit is used for audio data reception and/or transmission of audio data via the second protocol. In the second control configuration duration of BLE connection events is limited to a maximum duration shorter than the maximum duration of BLE connection events in the first control configuration.

25 Claims, 5 Drawing Sheets

(56) References Cited

U.S. PATENT DOCUMENTS

| | | | | |
|---|---|---|---|---|
| 2014/0064212 A1* | 3/2014 | Ko | ............................ | H04W 4/80 |
| | | | | 370/329 |
| 2016/0249356 A1 | 8/2016 | Pope | | |
| 2017/0265025 A1 | 9/2017 | Deck | | |
| 2017/0325161 A1* | 11/2017 | Kwon | .................... | H04W 76/10 |
| 2020/0382166 A1* | 12/2020 | Park | ...................... | H04W 36/14 |

* cited by examiner

COMMUNICATION DEVICE USING TWO WIRELESS PROTOCOLS

The disclosure relates to a communication device having a wireless interface which may use two different wireless protocols.

A communication device using two different wireless communication protocols may face interference problems resulting from the coexistence of two different protocols, in particular in case that the two protocols use overlapping frequency ranges and/or if the wireless interface comprises only a single transceiver.

US 2013/0064118 A1 relates to a method of minimizing interference between WLAN and Bluetooth so as to enhance network capacity in a network of devices using these protocols.

WO 2011/044056 A2 relates to a method for reducing interference between WLAN interfaces and Bluetooth interfaces based on measurement of physical parameters of the respective links, such as RSSI (Received Signal Strength Indicator) or packet error rate.

US 2016/0249356 A1 relates to a mobile device, which allows concurrent wireless transmission of control data via Bluetooth low energy ("BLE") and proprietary audio streaming, using the same physical layer of the radio, wherein the BLE control data have priority over the proprietary audio requests. An enhanced link layer determines, based on time slot information, whether a requested proprietary audio burst can be completed during the remaining duration of the current idle time period of the BLE connection.

Interference of a communication protocol, like a Bluetooth protocol, with an audio streaming protocol may result in disturbing audio artifacts. Such cases may occur, for example, when a hearing instrument engaged in audio streaming is simultaneously connected via a Bluetooth data connection to an accessory device, such as a mobile phone.

It is an objective of the disclosure to overcome the drawbacks of the prior art and to provide for an improved communication device having a wireless interface. In some embodiments of this disclosure, the disclosure provides for a communication device having a wireless interface which can apply both a BLE protocol and a second protocol suitable for exchanging both audio data and non-audio data, wherein interference between the two protocols is relatively low, in particular, so as to avoid audio artifacts.

It is a further objective to provide for a method of operating such communication device.

According to some embodiments of the disclosure, these objectives are achieved by a communication device as defined in the claims and a method as defined in the claims.

In such communication device, the controller is configured to apply a first control configuration while the transceiver unit is not used for audio data reception and/or transmission of audio data via the second protocol and to apply a second control configuration while the transceiver unit is used for audio data reception and/or transmission of audio data via the second protocol, wherein in the second control configuration the duration of BLE connection events is limited to a maximum duration, which is shorter than the maximum duration of BLE connection events in the first control configuration.

Thus, a throttling of the BLE traffic can be achieved in case of the use of the second protocol for audio data exchange, thereby reducing or eliminating audio artifacts resulting from interference with BLE traffic.

The BLE throughput may be reduced to an extent such that audio artifacts caused by BLE traffic are reduced to an acceptable level. Such BLE throttling is particularly useful for protecting "vulnerable" audio streams (e.g., audio streams particularly susceptible to audio artifacts caused by BLE traffic) from BLE audio artifacts.

According to some implementations, in the second control configuration the size of the BLE packets received by the transceiver unit is limited to a maximum size that is smaller than the maximum size of the received BLE packets in the first control configuration.

In some implementations, in the second control configuration the number of BLE packets received by the transceiver unit within a BLE connection event is limited to a number that is smaller than the maximum number of BLE packets received by the transceiver unit within a BLE connection event in the first control configuration.

Alternatively or in addition, the limitation of the size of the BLE packets or the limitation of the number of BLE packets within a BLE connection event may be applied to the BLE packets transmitted by the transceiver unit in the second control configuration.

In some implementations, in the second control configuration the number of BLE packets received and transmitted by the transceiver unit within a BLE connection event is limited via giving to only the first N BLE packets of the first protocol of a BLE connection event a higher priority than to audio packets of the second protocol, wherein N may be from 2 to 6.

In some implementations, in the second control configuration the number of BLE packets received and transmitted by the transceiver unit within a BLE connection event is limited by synchronizing the first and second protocol during a BLE connection event and establishing a coexistence window during which transmission of not more than one BLE packet and reception of not more than one BLE packet is enabled.

Some embodiments are defined in the dependent claims.

Examples of the disclosure are illustrated by reference to the drawings, wherein.

The drawings have not necessarily been drawn to scale. Similarly, some components and/or operations may be separated into different blocks or combined into a single block for the purposes of discussion of some of the embodiments of the disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory medium excludes a propagating signal.

As used hereinafter, an "audio stream" may include audio data only or audio data of the audio stream may be part of a media stream including audio and video data, e.g., the audio stream also may include video data. Typically, an audio stream is transmitted from an audio source to a plurality of audio sinks by broadcasting, e.g., the audio source acts as a broadcasting device that unidirectionally sends information to the receiver devices, wherein the receiver devices cannot provide feedback to the broadcasting device as to whether the information was received or not, e.g., there is no uplink.

A "communication device" is an electronic device having a wireless interface for communicating with other electronic devices. In particular, the communication device may be any type of head-worn hearing device, including any type of hearing instruments or hearing aids, auditory prostheses, earpieces, earphones, earbuds, headsets; such devices could be useable by hearing impaired persons or by normal hearing persons.

The term "connection event" as used herein is defined in section 4.5.1 of the Bluetooth 5.0 specification. A connection event is a phase, starting every connection interval, during which packets are exchanged between a BLE master and a BLE slave. The duration of the connection event can vary, depending on the amount of packets exchanged.

Figure 1:
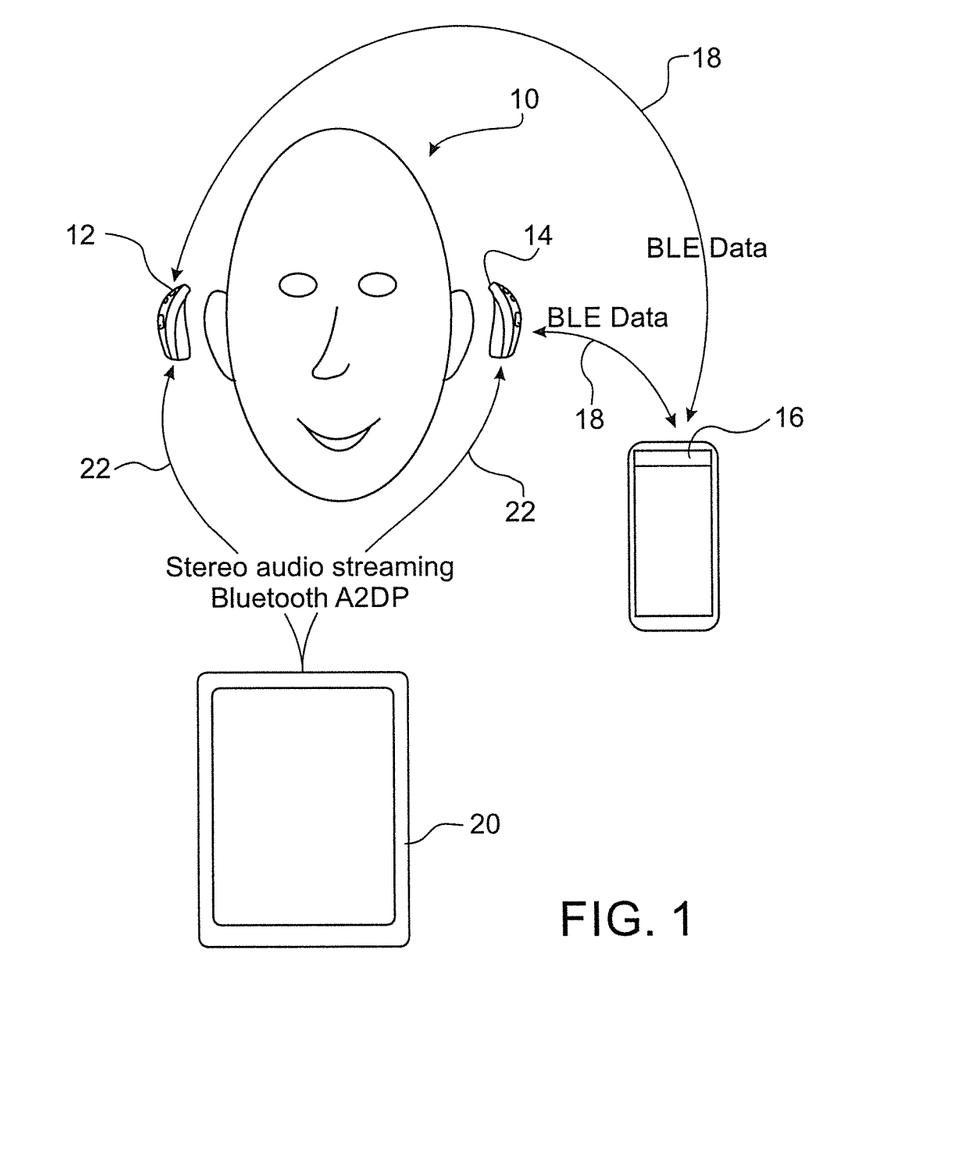
FIG. 1 illustrates a first example of a use situation of a binaural hearing system with simultaneous audio data and BLE data traffic.
Figure 3:
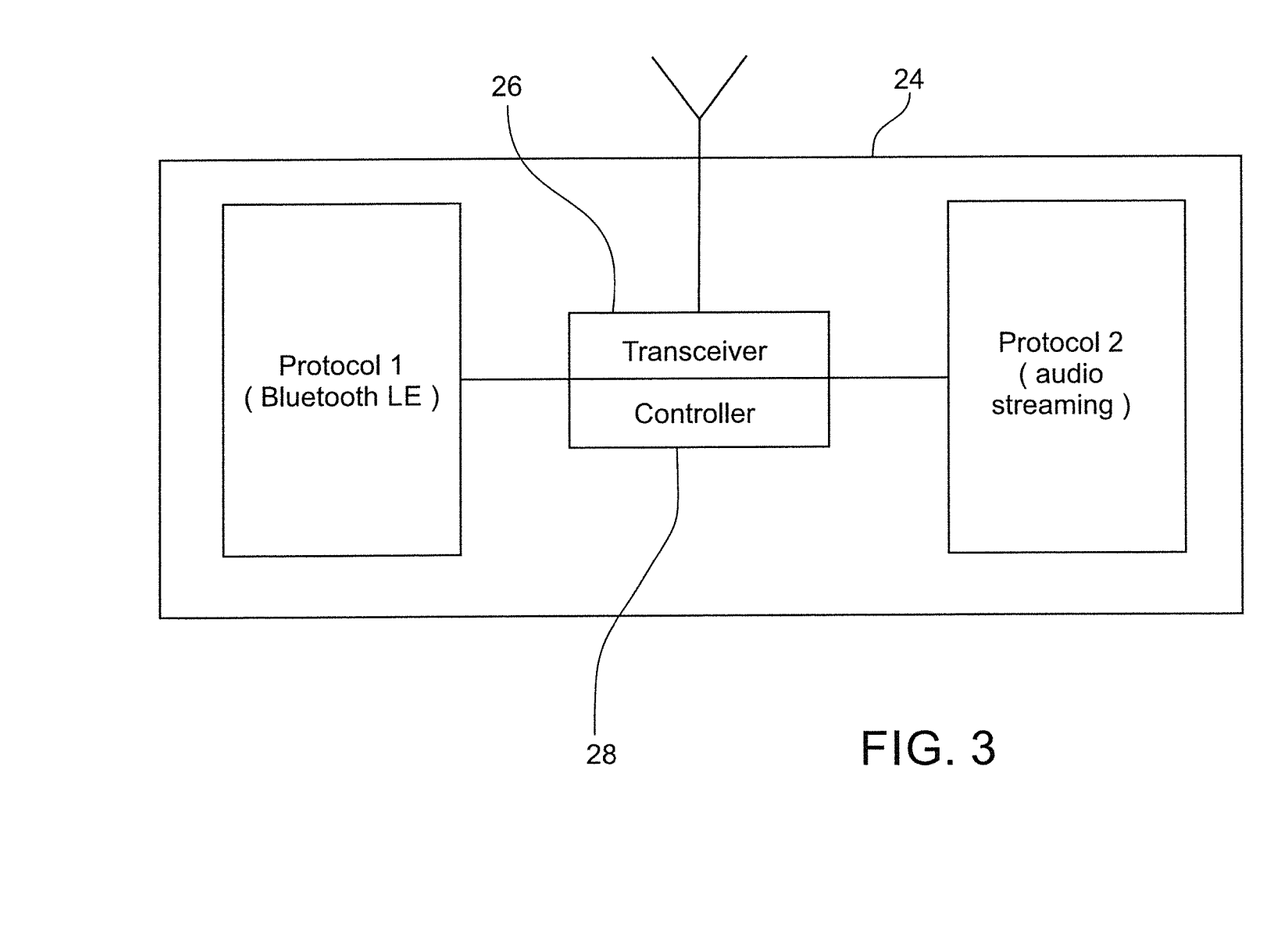
FIG. 3 schematically illustrates an example of the wireless interface of the hearing system of FIGS. 1 and 2.

FIG. 1 illustrates an example of a first use situation of a binaural hearing system 10 comprising a first hearing instrument 12 to be worn at one ear of a user and a second hearing instrument 14 to be worn at the other ear of the user. Each hearing instrument 12, 14 may communicate via a BLE data link 18 with an accessory device 16 having a BLE interface. Each hearing instrument 12, 14 may simultaneously receive audio data from or exchange audio data with an audio source 20 via an audio link 22. To this end, the hearing instruments 12, 14 are provided, as schematically illustrated in FIG. 3, with a wireless interface 24 comprising a transceiver unit 26 and a controller 28. The controller 28 is configured to control the transceiver unit 26 when applying a first protocol, which is a BLE protocol, and a second protocol, which is suitable for exchanging both audio data and non-audio data.

According to some implementations, the second protocol may be a proprietary audio streaming protocol, a standard Bluetooth A2DP (Advanced Audio Distribution Profile) protocol or a standard Bluetooth HFP (Hands Free Profile) protocol.

In some implementations, the audio source device 20 may be a phone device, an audio streaming device, a tablet computer, a notebook or an ear-worn hearing instrument.

In some implementations, the accessory device 16 may be a smartphone or a remote control.

In the example of FIG. 1, the accessory device is a smartphone and the audio source device 20 is a tablet computer using Bluetooth A2DP for stereo audio streaming.

Figure 2:
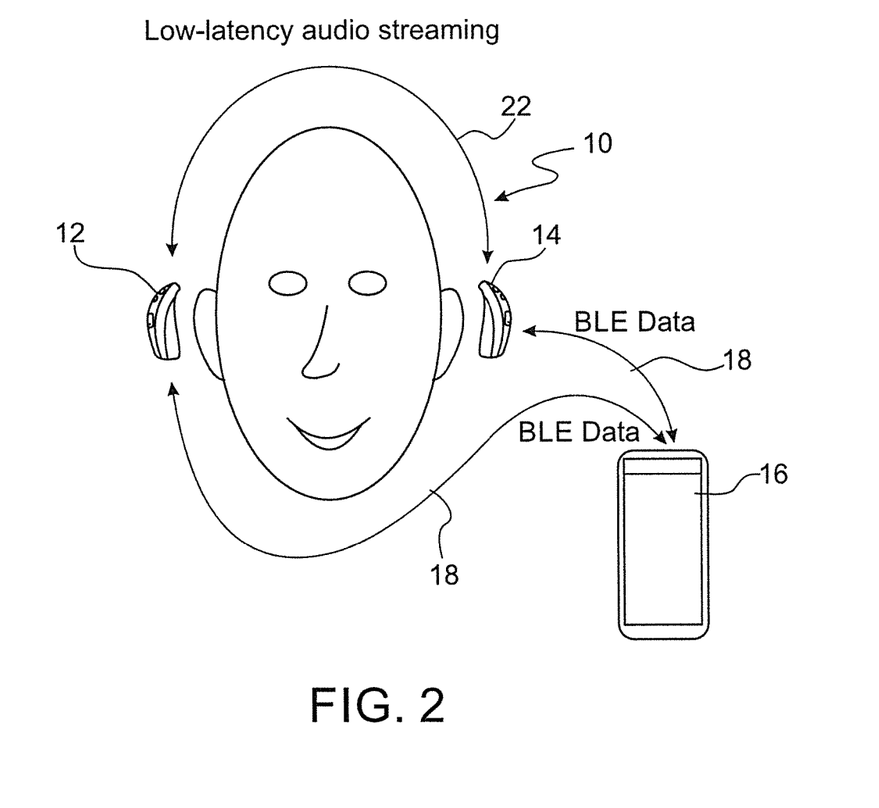
FIG. 2 illustrates a second example of a use situation of the binaural hearing system of FIG. 1 with simultaneous audio data and BLE data traffic.

Another example of a use situation of the binaural hearing system 10 is illustrated in FIG. 2, wherein the accessory device 20 is the same as FIG. 1, but each of the hearing instruments 12, 14 serves as an audio source device for the other one of the hearing instruments 12, 14, so that in this case the audio data exchange is represented by a low latency binaural audio stream 22.

It is to be understood that the principles disclosed herein with regard to the hearing system 10 are generally applicable to any type of communication device; each hearing instrument 12, 14 is only an example for a communication device to be used with the disclosure of the present application.

In some implementations, the communication device may be a body-worn device. In some implementations, the communication device may be a hearing instrument to be worn at ear level or it may be an earpiece. In some implementations, the communication device may be any kind of hearing aid or auditory prosthesis.

In some implementations, the communication device may be configured to take a BLE peripheral role when applying the first protocol.

The controller 28 is configured to apply a first control configuration while the transceiver 26 is not used for audio data reception and/or transmission of audio data via the second protocol and to apply a second control configuration while the transceiver unit 26 is used for audio data reception and/or transmission of audio data via the second protocol. In the second control configuration the duration of BLE connection events is limited to a maximum duration shorter than the maximum duration of BLE connection events in the first control configuration. Thereby, the BLE traffic may be effectively throttled in the presence of audio streaming so as to reduce audio artifacts caused by BLE traffic.

In some implementations, the transceiver unit 26 is formed by a single transceiver. In other implementations, the transceiver unit 26 may comprise a plurality of transceivers. The selective BLE throttling described herein in particularly suitable for the use of a single transceiver.

Figure 4:
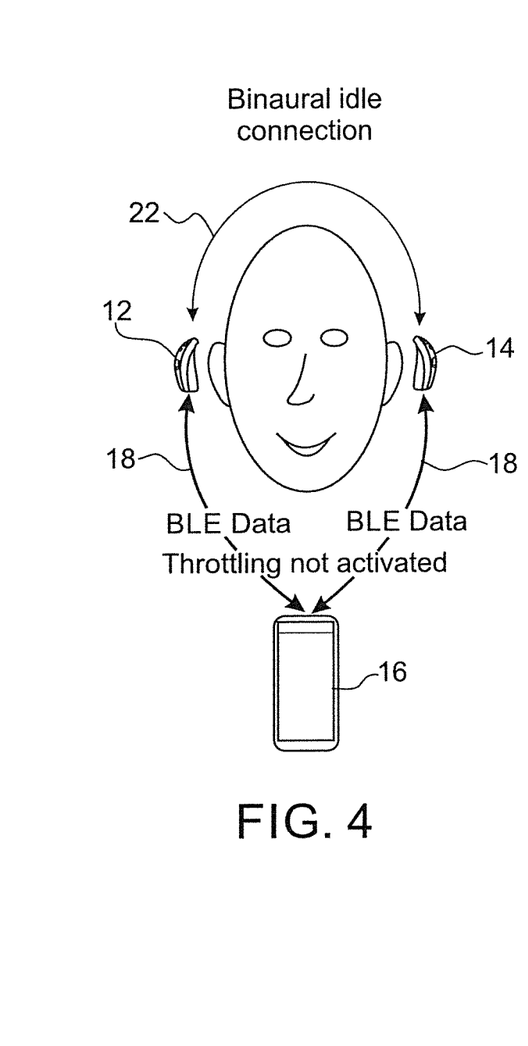
FIG. 4 illustrates an example of use situation of the binaural hearing system of FIGS. 1 and 2, wherein no audio streaming takes place.
Figure 5:
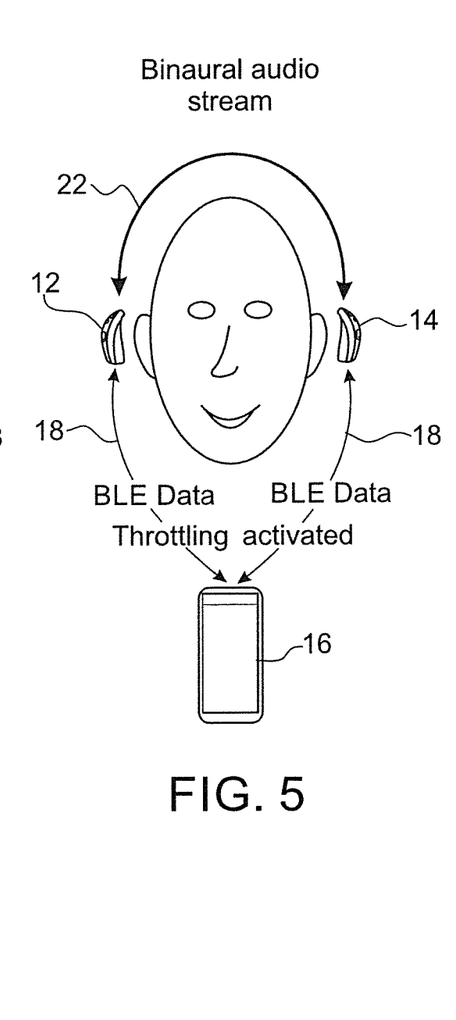
FIG. 5 illustrates an example of a use situation of the system of FIG. 4 during the presence of a binaural audio stream.
Figure 6:
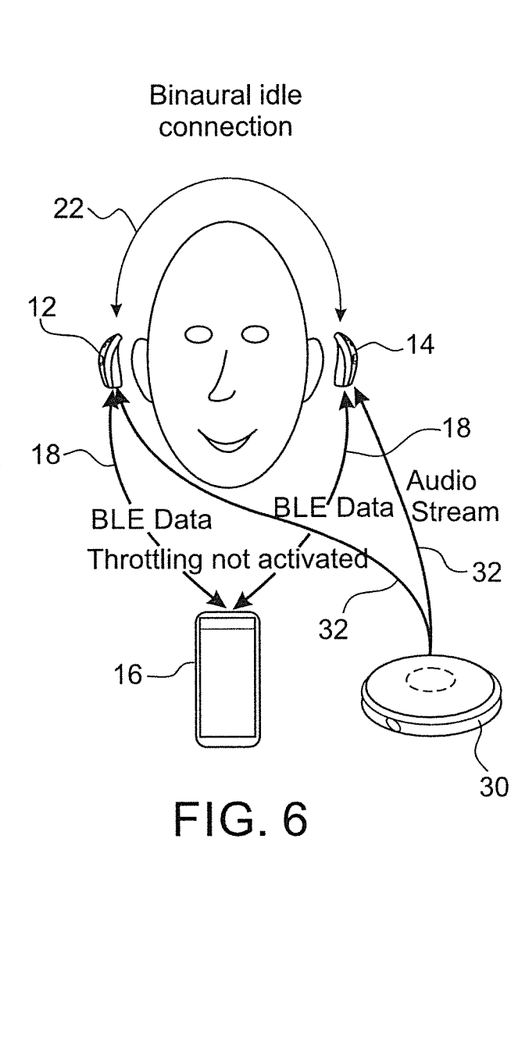
FIG. 6 illustrates an example of a use situation of the system of FIGS. 4 and 5, wherein an audio stream is present which is more robust than the binaural audio stream of FIG. 5.

Examples of practical application of such selective BLE throttling are illustrated in FIGS. 4 to 6. FIG. 4 shows an example in which there is no binaural audio streaming via the audio link 22 between the hearing instruments 12 and 14; rather there is only an idle binaural connection via the link 22. Also, there is no other link with audio streaming. Thus, the transceiver 26 of the hearing instruments 12, 14 is controlled by the controller 28 in such a manner that the first control configuration is applied, so that there is no throttling of the BLE link 18 between the accessory device 16 and the hearing instruments 12, 14.

In the example of FIG. 5 a binaural audio stream via the link 22 is present between the hearing instrument 12 and 14, which binaural audio stream is considered to be "vulnerable" in the sense that it is susceptible to audio artifacts caused by to BLE traffic. Consequently, the controller 28 applies the second control configuration, in which the BLE data traffic via the link 18 is throttled by limiting the maximum duration of BLE connection events, so as to protect the binaural audio stream 22—at least to some extent—from audio artifacts due to BLE data traffic.

In the example of FIG. 6 there is no active audio stream between the hearing instruments 12 and 14 via the binaural link 22 (as in FIG. 4); however, there is another audio source device 30, which is connected to each of the hearing instruments 12, 14 via a wireless audio link 32 so as to establish an audio stream from the audio source device 30 to the hearing instruments 12, 14. The wireless audio link 32 uses a protocol which different from that used in the binaural link 22. However, unlike the binaural audio stream via the link 22, the audio stream via the link 32 is considered to be a robust audio stream in the sense that it is not susceptible to audio artifacts caused by BLE data traffic. Accordingly, the controller 28 controls the transceiver 26 in this case by applying the first control configuration, in which there is no BLE throttling.

Thus, as in the example of FIG. 6, the controller 28 may be configured to control the transceiver 26 also by applying a third protocol (which is the protocol used by the link 32), which is suitable for exchanging both audio data and non-audio data, while not applying the second protocol (which is used by the link 22), with the first control configuration being applied when applying the first protocol (which is the BLE protocol) and the third protocol (but not the second protocol) simultaneously.

There are several options for achieving the desired BLE throttling in practice.

For example, in some implementations, the size of the BLE packets received and/or transmitted by the transceiver unit may be limited to a maximum size that is smaller, in the second control configuration, than the maximum size of the BLE packets received and/or transmitted by the transceiver unit in the first control configuration. For example, the size of the BLE packets received by the transceiver unit in the second control configuration may be limited via transmitting to the peer device (e.g., the accessory device 16) a LLCP (Logical Link Control Protocol) control message specifying the maximum size of packets transmitted by the peer device. Also the size of the BLE packets transmitted by the transceiver unit in the second control configuration may be limited; in this case, the peer device may be informed about this limitation via transmitting to the peer device a LLCP control message specifying the maximum size of packets transmitted to the peer device. For example, the size of the BLE packets received and/or transmitted by the transceiver unit in the second control configuration may be limited to a maximum size of 27 bytes.

Alternatively or in addition to limiting the size of the BLE packets received and/or transmitted by the transceiver unit, in some implementations the number of BLE packets received and/or transmitted by the transceiver unit within a BLE connection event may be limited to a number that is smaller than the maximum number of BLE packets received and/or transmitted by the transceiver unit within a BLE connection event in the first control configuration.

In some implementations, the number of BLE packets received by the transceiver unit within a BLE connection event may be limited in the second control configuration via not listening to further messages exceeding the maximum number of BLE packets, even if the "more data bit" ("MD") of the last BLE packet received by the transceiver unit had the value 1.

In some implementations, the number of BLE packets transmitted by the transceiver unit within a BLE connection event in the second control configuration may be limited via setting the value of the MD bit to zero, even if more data is pending for transmission.

In some implementations, the number of BLE packets received by the transceiver unit within a BLE connection event is limited in the second control configuration to one packet and/or the number of BLE packets transmitted by the transceiver unit within a BLE connection event is limited in the second control configuration to one packet. In this case, at most one reception attempt and at most one transmission attempt is allowed in a second control configuration during each BLE connection event.

In some implementations, in the second control configuration the number of BLE packets received by the transceiver unit within a BLE connection event and the number of BLE packets transmitted by the transceiver and within a BLE connection event is limited via giving to only the first N BLE packets of a BLE connection event a higher priority than to audio packets of the second protocol, wherein N is from 2 to 6 (by contrast, in the first control configuration BLE packets always may have a higher priority than packets of the second protocol). For example, N may be limited to two.

Figure 7:
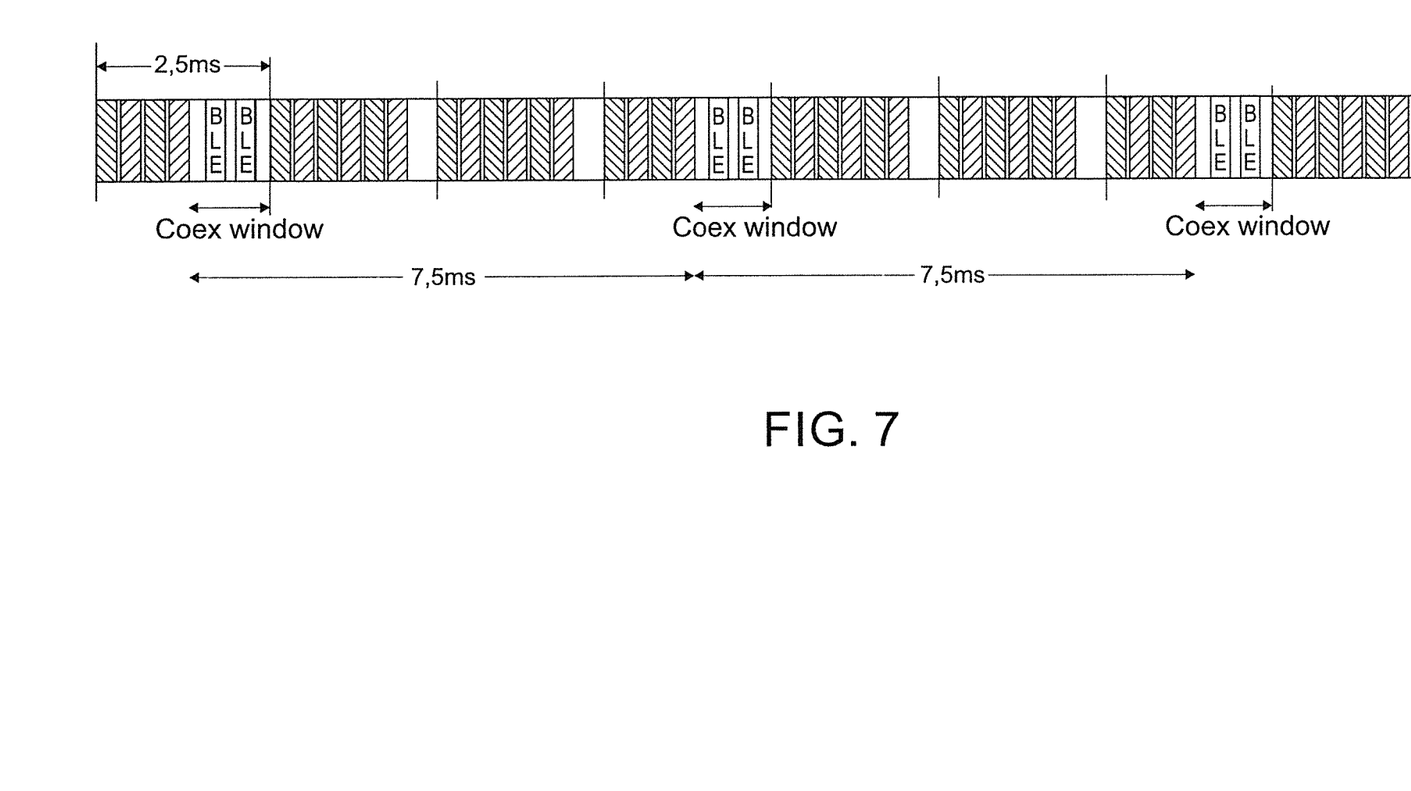
FIG. 7 schematically illustrates an example of the timeline of the data traffic in a system like that of FIG. 1 to 6, wherein a coexistence window is provided for BLE data exchange.

In some implementations, in the second control configuration the number of BLE packets received by the transceiver unit within a BLE connection event and the number of BLE packets transmitted by the transceiver unit within a BLE connection event is limited by synchronizing the first and second protocol during a BLE connection event and establishing a coexistence window during which transmission of not more than one BLE packet and reception of not more than one BLE packet is enabled. An example of such implementation is shown in FIG. 7 wherein such coexistence window is repeated with a periodicity of 7.5 ms for a frame length of 2.5 ms, so that in each third frame there is a coexistence window allowing traffic of two BLE packets in the last two slots of the six slots of a frame. For example, the timing of the second protocol, which may be a binaural protocol, may be controlled by the master of this protocol, which, in turn, may be the slave of the BLE connection with the accessory device (e.g., a mobile phone). The master of the second protocol then may schedule the audio transfer via the second protocol such that it is time aligned/synchronized with the BLE periodic data traffic.

The phrases "in some implementations," "according to some implementations," "in the implementations shown," "in other implementations," and generally mean the particular feature, structure, or characteristic following the phrase is included in at least one implementation of the disclosure, and may be included in more than one implementation. In addition, such phrases do not necessarily refer to the same embodiments or different implementations.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

What is claimed is:

1. A communication device, comprising
   a wireless interface (24) including
      a transceiver unit (26), and
      a controller (28) configured to control the transceiver unit when applying a first protocol which is a Bluetooth Low Energy ("BLE") protocol and a second protocol which is suitable for exchanging both audio data and non-audio data;
   wherein the controller is further configured to:
      apply a first control configuration while the transceiver unit is not used for audio data reception and/or transmission of audio data via the second protocol, and
      apply a second control configuration while the transceiver unit is used for audio data reception and/or transmission of audio data via the second protocol,
   wherein in the second control configuration duration of BLE connection events is limited to a maximum duration shorter than the maximum duration of BLE connection events in the first control configuration.

2. The communication device of claim 1, wherein in the second control configuration the size of the BLE packets received by the transceiver unit (26) is limited to a maximum size that is smaller than the maximum size of the received BLE packets in the first control configuration.

3. The communication device of claim 2, wherein in the second control configuration the size of the BLE packets received by the transceiver unit (26) is limited via transmitting a LLCP control message specifying the maximum size of received packets.

4. The communication device of claim 2, wherein in the second control configuration the size of the BLE packets received by the transceiver unit (26) is limited to a maximum size of 27 bytes.

5. The communication device of claim 1, wherein in the second control configuration the size of the BLE packets transmitted by the transceiver unit (26) is limited to a maximum size that is smaller than the maximum size of the transmitted BLE packets in the first control configuration.

6. The communication device of claim 5, wherein an accessory device acting as a peer device is informed of this limitation via transmitting, by the transceiver unit (26), a LLCP control message specifying the maximum size of transmitted packets.

7. The communication device of claim 5, wherein in the second control configuration the size of the BLE packets transmitted by the transceiver unit (26) is limited to a maximum size of 27 bytes.

8. The communication device of claim 1, wherein in the second control configuration the number of BLE packets received by the transceiver unit (26) within a BLE connection event is limited to a number that is smaller than the maximum number of BLE packets received by the transceiver unit within a BLE connection event in the first control configuration.

9. The communication device of claim 8, wherein in the second control configuration the number of BLE packets received by the transceiver unit (26) within a BLE connection event is limited via not listening to further messages exceeding the maximum number of received BLE packets, even if the "more data bit" ("MD") of the last BLE packet received by the transceiver unit had the value 1.

10. The communication device of claim 8, wherein in the second control configuration the number of BLE packets received by the transceiver unit (26) within a BLE connection event is limited to one packet.

11. The communication device of claim 8, wherein in the second control configuration the number of the BLE packets received by the transceiver unit (26) within a BLE connection event and the number of the BLE packets transmitted by the transceiver unit within a BLE connection event is limited via giving to only the first N BLE packets of the first protocol of a BLE connection event a higher priority than to audio packets of the second protocol, where N is from 2 to 6.

12. The communication device of claim 8, wherein in the second control configuration the number of the BLE packets received by the transceiver unit (26) within a BLE connection event and the number of the BLE packets transmitted by the transceiver unit within a BLE connection event is limited by synchronizing the first and second protocol during a BLE connection event and establishing a coexistence window during which transmission of not more than one BLE packet and reception of not more than one BLE packet is enabled.

13. The communication device of claim 1, wherein in the second control configuration the number of BLE packets transmitted by the transceiver unit (26) within a BLE connection event is limited to a maximum number that is smaller than the number of BLE packets transmitted by the transceiver unit within a BLE connection event in the first control configuration.

14. The communication device of claim 13, wherein in the second control configuration the number of BLE packets transmitted by the transceiver unit (26) within a BLE connection event is limited via setting value of the MD bit to zero, even if more data is pending for transmission.

15. The communication device of claim 13, wherein in the second control configuration the number of BLE packets transmitted by the transceiver unit (26) within a BLE connection event is limited to one packet.

16. The communication device of claim 1, wherein the controller is configured to control the transceiver unit also when applying the first protocol and a third protocol, wherein the third protocol is suitable for exchanging both audio data and non-audio data, while the transceiver unit does not apply audio data exchange via the second protocol, and wherein the controller is further configured to apply the first control configuration while the transceiver unit is not used for reception and/or transmission of audio data via the second protocol but is used for reception and/or transmission of audio data via the third protocol.

17. The communication device of claim 1, wherein the second protocol is a proprietary audio streaming protocol, a standard Bluetooth A2DP protocol or a standard Bluetooth HFP protocol.

18. The communication device of claim 1, wherein the communication device is a body-worn device (12, 14).

19. The communication device of claim 18, wherein the communication device is a hearing instrument (12, 14) to be worn at ear level or an earpiece.

20. The communication device of claim 1, wherein the communication device (12, 14) is configured to take a BLE peripheral role when applying the first protocol.

21. A system comprising a communication device (12, 14) of claim 1, an accessory device (16) having a BLE interface for connecting with the communication device via the first protocol, and an audio source device (12, 14, 20) having an interface for connecting with the communication device via the second protocol.

22. The system of claim 21, wherein the accessory device (16) is a smartphone or a remote control.

23. The system of claim 21, wherein the audio source device (30) is a phone device, an audio streaming device, a tablet computer, a notebook or an ear-worn hearing instrument (12, 14).

24. A method of operating a communication device (12, 14) comprising a wireless interface (24) including a transceiver unit (26) and a controller (28), the method comprising:

controlling, by the controller, the transceiver unit when applying a first protocol which is a Bluetooth Low Energy ("BLE") protocol and a second protocol which is suitable for exchanging both audio data and non-audio data by:

applying a first control configuration while the transceiver unit is not used for audio data reception and/or transmission of audio data via the second protocol, and applying a second control configuration while the transceiver unit is used for audio data reception and/or transmission of audio data via the second protocol, wherein in the second control configuration, the duration of BLE connection events is limited to a maximum duration shorter than the maximum duration of BLE connection events in the first control configuration.

25. A non-transitory computer-readable medium having a program stored therein for causing a processor, to execute a process that causes a device to perform the method of claim 24.

* * * * *